US006863165B2

(12) United States Patent
Koslowski

(10) Patent No.: US 6,863,165 B2
(45) Date of Patent: Mar. 8, 2005

(54) OVERLOAD PROTECTION ARRANGEMENT FOR A ROTATABLE POWER TOOL

(75) Inventor: Oliver Koslowski, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/424,316

(22) Filed: Apr. 28, 2003

(65) Prior Publication Data

US 2003/0221928 A1 Dec. 4, 2003

(30) Foreign Application Priority Data

May 2, 2002 (DE) ........................................ 102 19 755

(51) Int. Cl.[7] .......................... B23Q 11/04; F16D 43/20
(52) U.S. Cl. .................... 192/48.2; 192/56.42; 173/178
(58) Field of Search ............................... 192/48.2, 55.1, 192/56.42, 56.56, 69.81, 30 W, 108; 477/8, 12, 13; 173/178

(56) References Cited

U.S. PATENT DOCUMENTS 3,240,304 A * 3/1966 Wickersham ............ 192/56.42
3,967,711 A * 7/1976 Stroezel et al. ............. 192/108
4,257,147 A * 3/1981 Moss ............................ 19/12
4,340,133 A * 7/1982 Blersch .................... 192/30 W
5,419,745 A * 5/1995 Moolenaar et al. ........... 477/20
5,868,208 A * 2/1999 Peisert et al. ............... 173/178

FOREIGN PATENT DOCUMENTS

DE 3428410 2/1983
DE 4119941 1/1993

* cited by examiner

*Primary Examiner*—Richard M. Lorence
(74) *Attorney, Agent, or Firm*—Sidley Austin Brown & Wood, LLP

(57) ABSTRACT

An overload protection arrangement for a portable power tool includes a magnetic clutch (5) arranged in a drive train of the power tool between an electromotor (1) and a tool chuck (3), control electronics (6) for controlling the magnetic clutch (5), a self-actuated torque-dependent overload clutch (7) likewise arranged in the drive train, and a sensor (8) for detecting an open condition of the overload clutch (7) upon the overload of the drive train and connected with the control electronics (6).

13 Claims, 1 Drawing Sheet

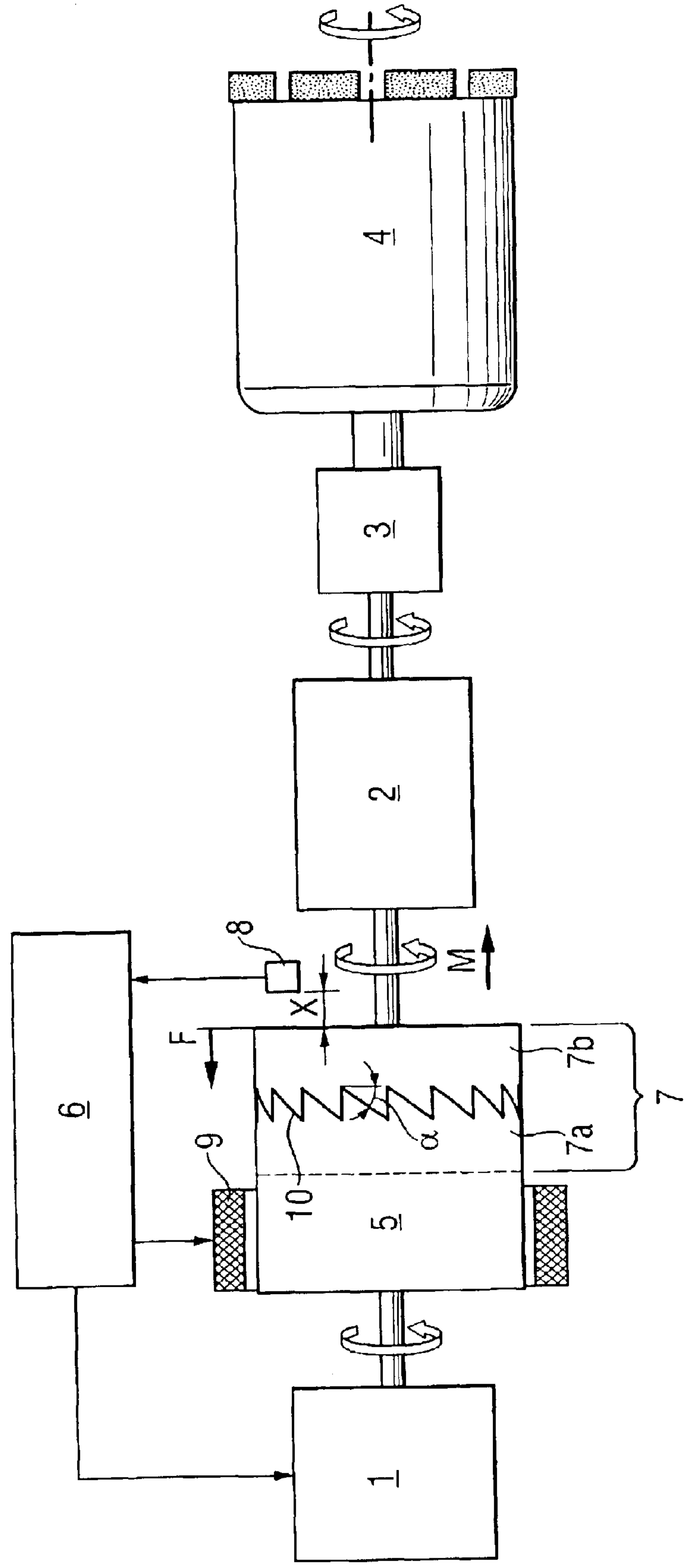
4
3
2
1
5
6
7
7a
7b
8
9
10
F
M
X
α

OVERLOAD PROTECTION ARRANGEMENT FOR A ROTATABLE POWER TOOL

BACKGROUND OF THE INVENTION

1. Field of the Invention

The present invention relates to an overload protection for rotatable power tools and, in particular, for portable core drilling machines or power tools for concrete.

2. Description of the Prior Art

During core drilling in concrete with annular core bits formed of a hard material and having a diameter greater than 100 mm, high press-on forces and torques, which are usually generated during core drilling, lead to very high loads acting on the power tools the dimensions of which, based on a required power, are limited because of the portability requirements. Therefore, these power tools require a good overload protection to prevent damage of the power tools, in particular, the damage of their electromotor and torque-transmitting gears.

German Publication DE-41 19 941 discloses a portable power tool in which for protection of the annular core bit-driving electric motor, the current and temperature are monitored with control electronics which, if needed, cut the power supply from the electric motor by actuating a power switch.

German Publication DE-31 28 410 discloses a power tool in which the acting torque is monitored by control electronics which, in case of overload, cuts off the drive train from the electronic motor by operating a magnetic clutch.

An object of the present invention is to provide an overload protection arrangement for a portable power tool and which while being dimensioned for high press-on forces and torques, occupies relatively small space.

SUMMARY OF THE INVENTION

This and other objects of the present invention, which will become apparent hereinafter, are achieved by providing an overload protection arrangement including a magnetic clutch arranged in a drive train of the power tool between an electromotor and a tool chuck, control electronics for controlling the magnetic clutch and which, upon an overload of the drive train, by controlling an operation of the magnetic clutch, keeps the drive train open until the control electronic is reset upon the overload being eliminated, so that the drive train becomes closed, a self-actuated, torque-dependent overload clutch likewise arranged in the drive train, and a sensor for detecting an open condition of the overload clutch upon the overload of the drive train and connected with the control electronics.

With the clutch condition of the overload clutch being monitored by the clutch sensor, the magnetic clutch is disabled upon an overload that is caused even by a small load, so that no reclosing of the drive train under a load takes place.

Therefore, upon dimensioning of the overload clutch, its wear or friction-caused heat need not to be taken into account, whereby a space-saving arrangement is obtained.

Advantageously, the overload clutch is formed as a preloaded, frictional ratchet clutch having axially displaceable over a predetermined path, under an overload, clutch elements. This permits to obtain a compact shape.

Advantageously, the clutch sensor is formed as a displacement, preferably contactless, sensor. Such sensors are widely available.

Advantageously, the magnetic clutch includes a magnetic coil for preloading the overload clutch, and at least one component of a magnetic force generated by the magnetic coil acts along the displacement path of the overload clutch. Thereby, no separate spring means needs to be provided in the overload ratchet coupling, and its preload is controlled by the control electronics.

Advantageously, the overload ratchet clutch has a plurality of friction surfaces inclined to an axial plane, whereby at a predetermined preload, the friction-induced threshold torque is greater than with axially extending friction surfaces.

Advantageously, the inclination angle amounts to between 20° and 50°, preferably, to 35°, whereby threshold torque can be increased in about four times in comparison with a threshold torque obtainable with axially extending friction surfaces.

Advantageously, the coupling members of the overload clutch form magnetic elements of the magnetic clutch which are controlled by a magnetic coil. Thus, the magnetic clutch, in effect, forms the overload clutch.

The method of controlling the overload protection arrangement includes detecting a torque-dependent overload with the clutch-sensor which detects a change in the clutch condition of the overload clutch caused by the overload and transmits an overload signal continuously or repeatedly discretely to the control electronics, controlling, with the control electronics, the magnetic clutch so that the drive train remains open, and resetting the control electronics, whereby the drive train is closed again.

Advantageously, upon opening of the drive train by the control electronics, which operates the magnetic clutch, the electric motor is actively braked, e.g., by pole changing, so that braking is effected more rapidly.

Advantageously, the resetting of the control electronics is effected with a fed current upon opening of the drive train or after a predetermined time limit offer separation of the electric motor. The drive train is closed again by the magnetic coupling after a new start of the electric motor.

Advantageously, the predetermined time limit, after which the control electronic is reset, follows a new start of the electric motor with a low rotational speed and which is effected as a result of the clutch sensor monitoring an engagement condition of the overload clutch. In case of an error, the drive train is immediately open by the magnetic clutch.

Alternatively, the initial time limit follows, advantageously, a new start of the electric motor with a low rotational speed in a direction opposite the direction the electric motor rotates during operation of the power tool. This insures a reliable complete engagement of the clutch members of the overload clutch.

The novel feature of the present invention, which are considered as characteristic for the invention, are set forth in the appended claims. The invention itself, however both as to its construction and its mode of operation, together with additional advantages and object thereof, will be best understood from the following detailed description of preferred embodiment, when read with reference to the accompanying drawings.

BRIEF DESCRIPTION OF THE DRAWINGS

Single FIGURE of the drawings shows a schematic view illustrating the principle of the overload protection of a portable power tool.

DETAILED DESCRIPTION OF THE PREFERRED EMBODIMENT

According to the present invention, for protection of a portable power tool from overload, there is provided, in a drive train between an electric motor 1 and a tool chuck 3 the rotation to which is transmitted by a gear 2 and which receives an annular core bit 4, a magnetic clutch 5 which is controlled by control electronics 6. After disconnection of the drive train because of a torque-dependent overload acting on the drive train, the control electronics 6 is reset, closing the drive train by acting on the magnetic clutch 5. In addition, there is provided, in the drive train, a self-actuated, torque-dependent overload clutch 7 the disengagement condition of which in response to the overload of the drive train is detected by a contactless clutch sensor 8. The overload clutch 7 is formed as a preloaded frictional ratchet clutch and includes two clutch members 7*a* and 7*b* displaceable axially-from each other over a coupling path X by a torque M upon the overload of the drive train.

A magnetic coil 9 of the magnetic clutch 5 generates a magnetic coupling force F along the coupling path X of the ratchet clutch and which provides for the preload of the overload clutch 7. The overload clutch 7 has a plurality of friction surfaces 10 which extend at an inclination angle $\alpha$ of 30° to an axial plane. The displaceable clutch members 7*a*, 7*b* of the ratchet coupling which are magnetic, form magnetic clutch elements of the magnetic clutch 5 which are actuated by the magnetic coil 9.

The operation of the load protection arrangement according to the present invention should be obvious from the foregoing description. However, it will now be described below for completeness sake. Upon occurrence of the torque-dependent overload, the overload clutch 7 opens the drive train between the motor 1 and the gear 2, with the two clutch members 7*a*, 7*b* of the torque-dependent overload clutch 7 moving apart from each other. The clutch sensor 8 detects a change in the condition of the overload clutch 7 and transmits an overload signal to the control electronics 6 that keeps the magnetic clutch 5 in a position in which the drive train remains open. When the condition causing the overload is eliminated, the controlled electronic is resetted, energizing the magnetic coil 9 of the magnetic clutch 5, which results in closing of the drive train. The energized magnetic coil 9 acts on the clutch members 7*a*, 7*b* of the overload clutch 7, bringing them into engagement with each other, preloading the same for detecting a torque-dependent overload.

Though the present invention was shown and described with references to the preferred embodiment, such is merely illustrative of the present invention and are not to be construed as a limitation thereof and various modifications of the present invention will be apparent to those skilled in the art. It is therefore not intended that the present invention be limited to the disclosed embodiment or details thereof, and the present invention includes all variation and/or alternative embodiments within the spirit and scope of the present invention as defined by the appended claims.

What is claimed is:

1. An overload protection arrangement for a portable power tool, comprising a magnetic clutch (5) arranged in a drive train of the power tool between an electromotor (1) and a tool chuck (3); control electronics (6) for controlling the magnetic clutch (5) and which, upon an overload of the drive train, by controlling an operation of the magnetic clutch (5), keeps the drive train open until the control electronic is reset upon the overload being eliminated, whereby the drive train becomes closed; a self-actuated, torque-dependent overload clutch (7) likewise arranged in the drive train; and a sensor (8) for detecting an open condition of the overload clutch (7) upon the overload of the drive train and connected with the control electronics (6).

2. An overload protection arrangement according to claim 1, wherein the overload clutch (7) is formed as a preloaded, frictional ratchet clutch.

3. An overload protection arrangement according to claim 2, wherein the overload clutch (7) comprises two clutch members (7*a*, 7*b*) axially displaceable relative to each other upon the overload of the drive train over a path (X).

4. An overload protection arrangement according to claim 3, wherein the clutch condition detecting sensor (8) is formed as a displacement sensor.

5. An overload protection arrangement according to claim 4, wherein the displacement sensor is formed as a contactless sensor.

6. An overload protection arrangement according to claim 3, wherein the magnetic clutch (5) comprises a magnetic coil (9) for preloading the overload clutch, and at least one component of a magnetic force generated by the magnetic coil (9) acts along the displacement path (X) of the overload clutch (7).

7. An overload protection arrangement according to claim 2, wherein the overload clutch (7), which is formed as a ratchet clutch, has a plurality of friction surfaces (10) inclined to an axial plane at an inclination angle ($\alpha$).

8. An overload protection arrangement according to claim 7, wherein the inclination angle ($\alpha$) amounts to between 20° and 50°.

9. An overload protection arrangement according to claim 8, wherein the inclination angle ($\alpha$) amounts to 35°.

10. An overload protection arrangement according to claim 6, wherein the clutch members (7*a*, 7*b*) of the overload clutch (7) form magnetic elements of the magnetic clutch (5) which are controlled by the magnetic coil (9).

11. A method of controlling an overload protection arrangement for a portable power tool and including a magnetic clutch (5) arranged in a drive train of the power tool between an electromotor (1) and a tool chuck (3), control electronics (6) for controlling the magnetic clutch, a self-actuated, torque-dependent overload clutch (7) likewise arranged in the drive train, and a sensor for detecting an open condition of the overload clutch (7) and connected with the control electronics (6), the method comprising the steps of detecting a torque-dependent overload with the clutch sensor (8) which detects a change in the clutch condition of the overload clutch (7) caused by the overload and transmits an overload signal one of continuously and repeatedly discretely to the control electronics (6); controlling, with the control electronics (6) the magnetic clutch (5) so that the drive train remains open; braking the electromotor (1) upon opening of the drive train; and resetting the control electronics (6) for closing the drive train.

12. A method of controlling an overload protection arrangement for a portable power tool and including a magnetic clutch (5) arranged in a drive train of the power tool between an electromotor (1) and a tool chuck (3), control electronics (6) for controlling the magnetic clutch, a self-actuated, torque-dependent overload clutch (7) likewise arranged in the drive train, and a sensor for detecting an open condition of the overload clutch (7) and connected with the control electronics (6), the method comprising the steps of detecting a torque-dependent overload with the clutch sensor (8) which detects a change in the clutch condition of the overload clutch (7) caused by the overload and transmits an overload signal one of continuously and repeatedly discretely to the control electronics (6); controlling, with the control electronics (6) the magnetic clutch (5) so that the drive train remains open; and resetting the control electronics (6) for closing the drive train, wherein the resetting step comprises resetting the control electronics (6) by a fed current upon one of opening of the drive train and after a predetermined time limit after disablement of the electromotor (1).

13. A method according to claim 12, wherein the predetermined time limit follows one of start of the electric motor (1) by the clutch sensor (8) which monitors an engagement condition of the overload clutch (7) and counter-rotational new start of the electric motor (1).

* * * * *